United States Patent
Royneberg (10) Patent No.: US 6,722,110 B1
(45) Date of Patent: Apr. 20, 2004

(54) COMBINED BALER/BALE WRAPPER APPARATUS

(75) Inventor: Erling Royneberg, Naerbo (NO)

(73) Assignees: Baat B.V. Engineering, Hengelo (NL); Depuy International Limited, Leeds (GB); Albert Gerrit Veldhuizen, Elde (NL)

( * ) Notice: Subject to any disclaimer, the term of this patent is extended or adjusted under 35 U.S.C. 154(b) by 0 days.

(21) Appl. No.: 09/646,232

(22) PCT Filed: Nov. 23, 1999

(86) PCT No.: PCT/GB99/03882

§ 371 (c)(1),
(2), (4) Date: Sep. 12, 2000

(87) PCT Pub. No.: WO00/36903

PCT Pub. Date: Jun. 29, 2000

(51) Int. Cl.⁷ .............................................. B65B 11/00
(52) U.S. Cl. ............................. 53/588; 53/211; 53/587; 100/15; 100/27
(58) Field of Search .................. 53/211, 176, 587, 53/588; 100/5, 15, 27

(56) References Cited

U.S. PATENT DOCUMENTS

| | | | | |
|---|---|---|---|---|
| 4,205,513 A | * | 6/1980 | Shokoples | 100/5 |
| 4,756,143 A | * | 7/1988 | Lancaster | 53/588 |
| 5,048,271 A | * | 9/1991 | Walton | 53/588 |
| 5,152,125 A | * | 10/1992 | Laver | 53/588 |
| 5,596,864 A | * | 1/1997 | Reeves | 53/588 |
| 5,661,956 A | | 9/1997 | Tardif | 53/588 |
| 5,727,359 A | * | 3/1998 | Rampp | 53/587 |
| 5,802,805 A | * | 9/1998 | Øiestad | 53/211 |
| 5,822,967 A | * | 10/1998 | Hood et al. | 53/588 |
| 6,070,400 A | * | 6/2000 | Peeters et al. | 53/588 |
| 6,082,076 A | * | 7/2000 | Anderson et al. | 53/588 |

FOREIGN PATENT DOCUMENTS

| | | |
|---|---|---|
| EP | 0 110 110 A1 | 6/1984 |
| WO | WO97/18699 | 5/1997 |

* cited by examiner

*Primary Examiner*—Stephen F. Gerrity
*Assistant Examiner*—Louis Huynh
(74) *Attorney, Agent, or Firm*—Kunzler & Associates (57) ABSTRACT

A combined baling and wrapping apparatus for use in picking up crop material lying on the ground, forming the material into a bale, and applying stretched film wrapping to enclose the bale, said apparatus comprising: a frame; a film reel carrier mounted on the frame to rotate around the bale, said carrier extending at least partly around the bale when seen in plan view; a guide mounted on the frame and defining an orbital path of movement for the carrier around the bale; and, at least one holder for a film dispenser reel mounted on said carrier and rotatable around the bale during rotation of the carrier so that, when a bale has been formed in the chamber and the housing has been moved to the inoperative position, a dispenser reel, when mounted on the carrier, can apply stretch film wrapping to the bale simultaneously with rotation of the bale by the lower bale-forming means.

21 Claims, 7 Drawing Sheets

COMBINED BALER/BALE WRAPPER APPARATUS

BACKGROUND OF THE INVENTION

1. Field of the Invention

The invention relates to a combined baler and bale wrapper apparatus for use in (1) picking-up an agricultural crop material lying on the ground, (2) forming the material into a tightly packed bale, (3) applying stretchable plastics film wrapping to the bale to form a substantially sealed enclosure of the bale, and (4) discharging the wrapped bale.

2. Description of the Related Art

It is well known to use balers to form tightly packed bales e.g. of grass, hay or straw, and such balers can be of a type which (1) forms bales of rectangular cross section and (2) forms cylindrical bales of circular cross section (so-called "round" bales or "big bales")

Balers which form cylindrical bales are usually of the "fixed chamber" or "variable chamber" type, both of which will be well known to those of ordinary skill in the art and which therefore need not be described in more detail herein.

Bale wrappers are also well known, and are usually supplied with bales to be wrapped, in which the bales have been formed in a separate baler apparatus, and then deposited on the ground for subsequent pick-up and wrapping by a mobile bale wrapper. Alternatively, when a static bale wrapper is provided, it is supplied with bales by a fork-lift or other bale handling device.

Bale wrappers are (1) of the rotating turntable type, in which a bale is rotated simultaneously about its longitudinal axis (usually generally horizontal) and about an upright axis (usually generally vertical), while film is withdrawn from a static film dispenser reel in order to wrap the bale; or (2) of the "satellite" film dispenser reel type, in which the bale is rotated about its longitudinal axis while one or more film dispenser reel carries out orbital movement around the bale in substantially horizontal plane while film is withdrawn to apply stretched film wrapping around the bale.

The wrapping of newly mown bales of grass is being used widely to form silage (the mown grass has only been allowed to dry to a limited extent), and which avoids the problems of disposal of silage effluent with the more traditional methods of making silage in "clamps" or silage towers. However, up to now, it has been usual to provide two separate pieces of equipment (a baler and a bale wrapper) to carry out the two separate operations of (a) pick-up material lying on the ground and forming the bale and (b) wrapping the bale.

There have been attempts to provide a combined a baler/wrapper e.g. as disclosed in EP 0110110 (Manuli), Oiestad (782382) and Kverneland Underhaug (WO97/18699), but so far a technically and commercially viable design has not yet been developed. One believed draw-back of existing designs so far proposed is that they have been too complicated to manufacture, and operate.

BRIEF SUMMARY OF THE INVENTION

The present invention has therefore been developed primarily with a view to providing a combined baling and wrapping apparatus having a unique mounting and driving arrangement to apply stretched film wrapping to a bale, after the latter has been formed by bale-forming means of the apparatus, and utilising part of the bale-forming means to rotate the bale while wrapping takes place. In particular, the unique mounting and-driving arrangement allows at least one film dispenser reel to carry out orbital movement around the bale, utilising a simple and effective structure which does not interfere with the initial operation of the apparatus in a bale-forming mode, and which is easily brought into operation to carry out bale wrapping after simplified conversion of the apparatus from the bale-forming mode to a bale-wrapping mode.

According to the invention there is provided a combined baling and wrapping apparatus for use in picking-up crop material lying on the ground, forming the material into a bale, and applying stretched film wrapping to enclose the bale, said apparatus comprising:

a frame;

a wheel-set supporting the frame;

upper and lower bale-forming means mounted on the frame and defining a bale-forming chamber;

a pick-up device mounted on the frame and operative to pick-up crop material lying on the ground, and to feed such material to the bale-forming chamber;

a housing adjustably mounted on said frame for movement between a bale-forming position and an inoperative position, said upper bale-forming means being mounted on said housing for movement therewith;

a film reel carrier mounted on the frame to rotate around the bale, said carrier extending at least partly around the bale when seen in plan view;

a guide mounted on the frame and defining an orbital path of movement from the carrier around the bale; and, at least one holder for a film dispenser reel mounted on said corner and rotatable around the bale during rotation of the carrier so that, when a bale has been formed in the chamber and the housing has been moved to the inoperative position, a dispenser reel when mounted on the carrier can apply stretch film wrapping to the bale simultaneously with rotation of the bale by the lower bale-forming means.

The invention therefore provides a simple construction of bale wrapper device, incorporated in a combined baler/bale wrapper apparatus, and which can easily be brought into operation to wrap the bale after movement of the housing (and the upper bale-forming means) to the inoperative position.

The carrier preferably takes the form of a curved frame member provided with at least one mounting point for a film reel holder. In one preferred arrangement, two mounting points are provided, which are diametrically opposed to each other with respect to the axis of rotation of the carrier.

In one embodiment, the curved frame member takes the form of a complete circle, and drive means to rotate the frame may comprise a simple friction drive e.g. drive rollers engaging the inner and/or outer face of the frame, and also defining a circular guide path for the rotational movement of the frame.

In an alternative embodiment, the curved frame may be part circular e.g. may subtend an angle of between 180° and 270° at the axis of rotation of the carrier, leaving an exit aperture between free ends of the curved frame so that, upon completion of a wrapping cycle, the frame can be brought to rest with the exit aperture lying in the path of discharge of the wrapped bale, so that the frame does not obstruct the discharge of the bale.

To facilitate the discharge of the wrapped bale, it is preferred that at least part of the lower bale-forming means can be adjusted as a unit between an upper bale-forming position (and also the bale rotating position), and a lowered position permitting gravity discharge of the wrapped bale.

In addition, the carrier may be adjustably mounted for movement between a lowered bale-wrapping position, and a raised position which facilitates i.e. does not obstruct discharge of the wrapped bale.

The carrier may carry one or more film- dispenser reels, and which may extend upwardly of the carrier so that the top and bottom film edges are located substantially equidistantly above and below the axis of rotation of the bale. This will be suitable when it is desired to locate the carrier below the axis of rotation of the bale.

However, if it is desired to raise the height of the carrier e.g. so that it is located at or above the level of the axis of rotation of the bale, then it will be preferable to mount downwardly extending holders for the film reels, or to arrange the reels to extend above and below the level of the carrier.

The housing can be mounted on the frame in any convenient manner, so as to be adjustable between the bale-forming position and the inoperative position. However, one preferred arrangement provides a forward transversely extending pivot mounting, whereby the housing can be pivoted upwardly and forwardly in order to take-up the inoperative position. This therefore removes the upper bale-forming means wholly out of engagement with the bale, after the latter has been formed, and so that the housing and the upper bale forming means do not interfere with the subsequent bale wrapping operation.

The forward pivot mounting may comprise laterally spaced pivot mountings, and rearwardly extending arms connecting a housing hood to the pivot mountings. With such an arrangement, a suitable drive train to operate the upper bale forming means can be routed along the arms, or extend parallel thereto, so as to take-up a drive connection with the upper bale forming means, (which in the case of preferred application of the invention to a fixed chamber type of baler), may comprise a series of drive rollers arranged on a circular arc. A separate drive train can then be routed to the cylinders of the lower bale forming means. Also, with the hood in the inoperative position, a clear field of view can be made available to the driver of the propelling vehicle, to monitor the progress of the bale wrapping stage.

The apparatus of the invention may, if required, be self-propelled. Alternatively, the apparatus may be designed to be coupled with a propelling vehicle, and therefore may have coupling means provided on the frame to allow the frame to be coupled to a propelling vehicle in order to move the apparatus over the ground.

BRIEF DESCRIPTION OF THE DRAWINGS

Preferred embodiments of combined baler and bale wrapper apparatus according to the invention will now be described in detail, by way of example only, with reference to the accompanying drawings, in which:

FIG. 1 shows a series of drawings of a first embodiment of apparatus according to the invention, in which

FIG. 2 shows successive stages in bale forming, bale wrapping and bale discharge, via FIGS. 2a to 2e, corresponding generally with FIGS. 1a to 1e;

FIG. 3 shows a third embodiment of the invention, and in which

DETAILED DESCRIPTION OF THE INVENTION

The preferred embodiments of combined baling and wrapping apparatus according to the invention serve the purpose of picking-up agricultural crop material lying on the ground, forming the material into a bale, applying stretch film wrapping to enclose the bale, and discharging the wrapped bale.

Referring first to FIG. 1 of the drawings, this shows a first preferred embodiment of combined baler and bale wrapper apparatus according to the invention, and which is designated generally by reference 10. The apparatus has a frame 11 supported by a wheelset 12, and in which coupling means is provided on the frame to allow the frame to be coupled to a propelling vehicle (usually a tractor) in order to move the apparatus over the ground. In the preferred embodiment, the coupling means comprises a towing hitch 13 provided at the forward end of a towbar 14.

The apparatus 10 incorporates bale-forming means, to form a cylindrical bale, and in the preferred arrangement incorporates a fixed chamber type of baler. Upper bale-forming means 15 takes the form of a circular arrangement of rollers 16 mounted in a housing 17, and lower bale-forming means, designated generally by reference 18, comprises a part-circular arrangement of substantially parallel rollers 19. Alternatively, an arrangement of slack belts and rollers may form the lower bale-forming means 18. The upper and lower bale-forming means 15, 19 define a bale-forming chamber 20.

A pick-up device 21 is mounted on the frame 11 and is operative to pick-up agricultural crop material lying on the ground e.g. a swath of mown grass (not shown), and to feed such material to the bale-forming chamber 20 via an entrance slot (not shown in detail) formed in the lower arc of the chamber 20.

Figure 1A:
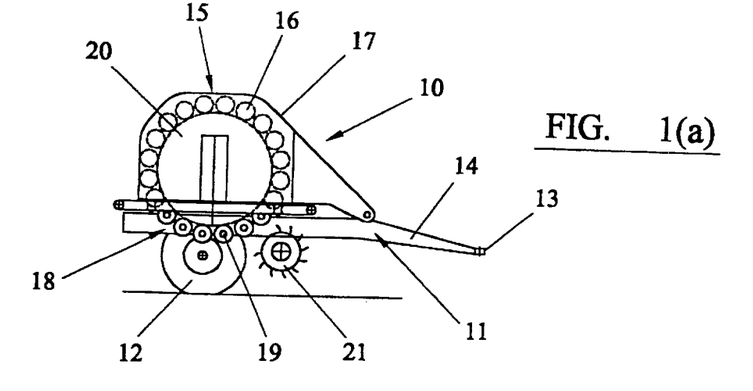
FIG. 1a shows the apparatus in side view, and in a bale-forming mode of operation.
Figure 1B:
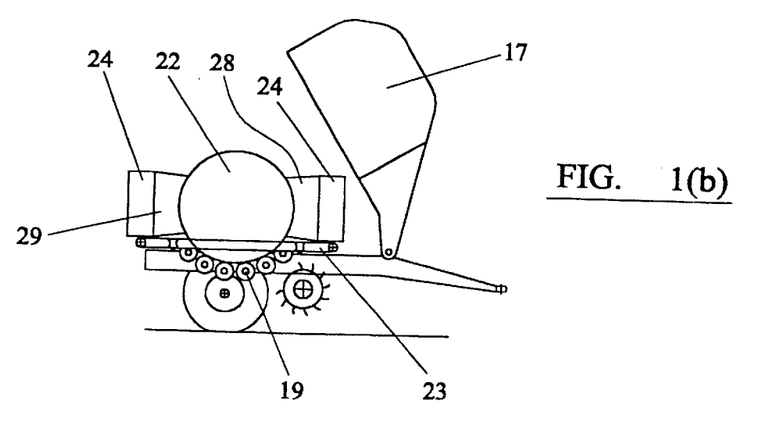
FIG. 1b shows in side view the apparatus converted to a bale wrapping mode.
Figure 1C:
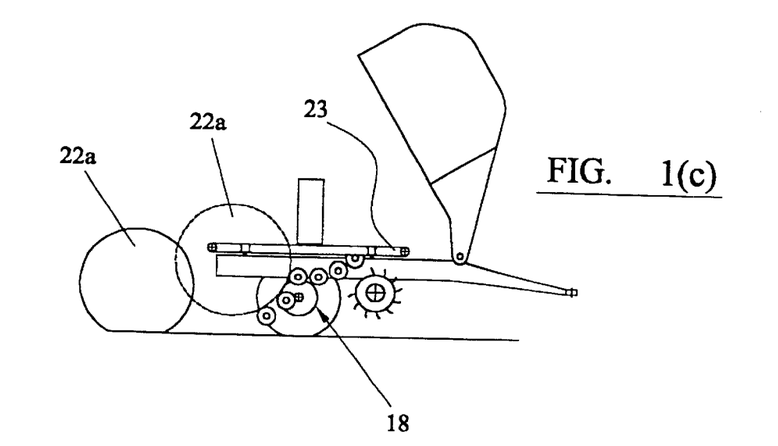
FIG. 1c shows the adjustment of the apparatus to allow discharge of a wrapped bale.

The housing 17 is adjustably mounted on the frame 11 for movement between a bale-forming position, as shown in FIG. 1a, and an inoperative position shown in FIGS. 1b and 1c. The upper bale-forming means 15 is mounted internally of the housing 17, and is therefore movable therewith, so that when the housing 17 takes-up the inoperative position, neither the housing, nor the bale-forming components thereof obstruct or interfere with the bale wrapping operation.

FIG. 1a shows the apparatus 10 in the bale-forming mode, whereas FIG. 1b shows the apparatus converted to the bale wrapping mode, in which a cylindrical bale 22 is supported by the rollers 19 of the lower bale-forming means 18, and which drive the bale 22 to rotate about its longitudinal axis, while stretch film wrapping is applied thereon to form a sealed enclosure of the bale.

The apparatus 10 therefore incorporates both apparatus to form a bale, and also apparatus to wrap a bale. The components forming the bale-wrapping part of the apparatus will now be described with reference to FIGS. 1b and 1e, the latter being a plan view of the components.

Figure 1D:
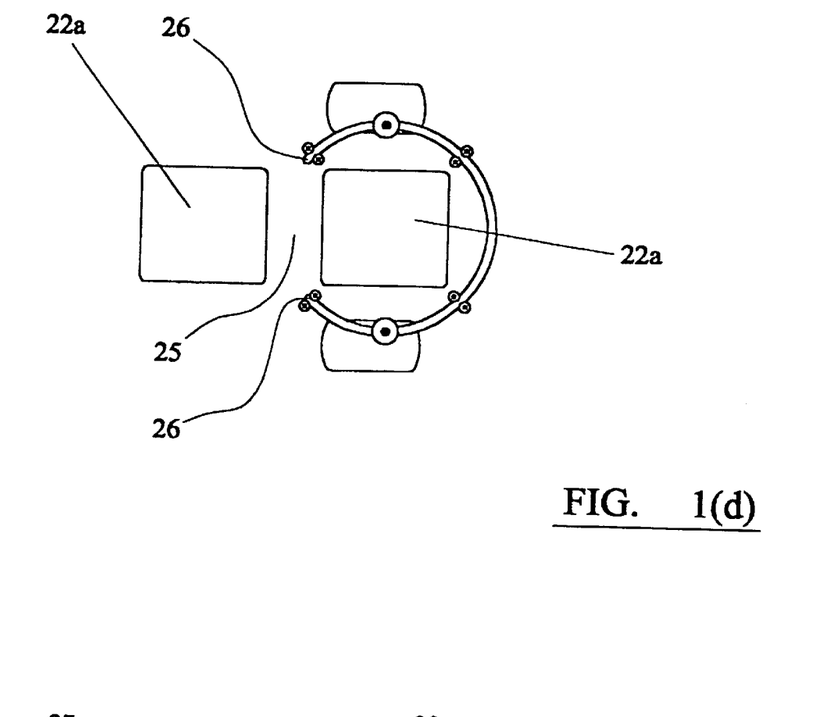
FIG. 1d is a plan view corresponding to FIG. 1c.
Figure 1E:
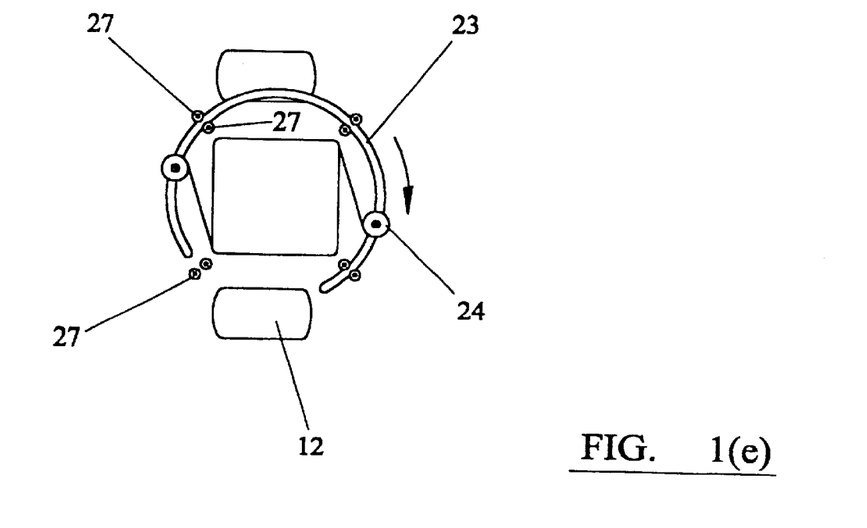
FIG. 1e is a plan view, corresponding to FIG. 1b, and showing in more detail the bale wrapping operation.
Figure 2A:
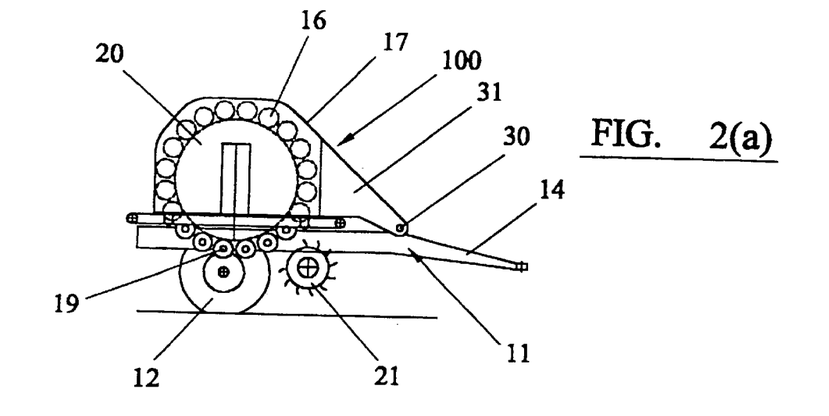
Figure 2B:
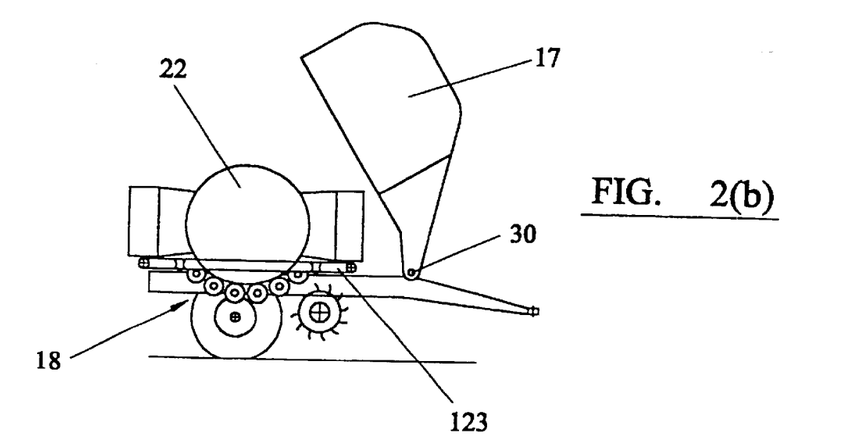
Figure 2C:
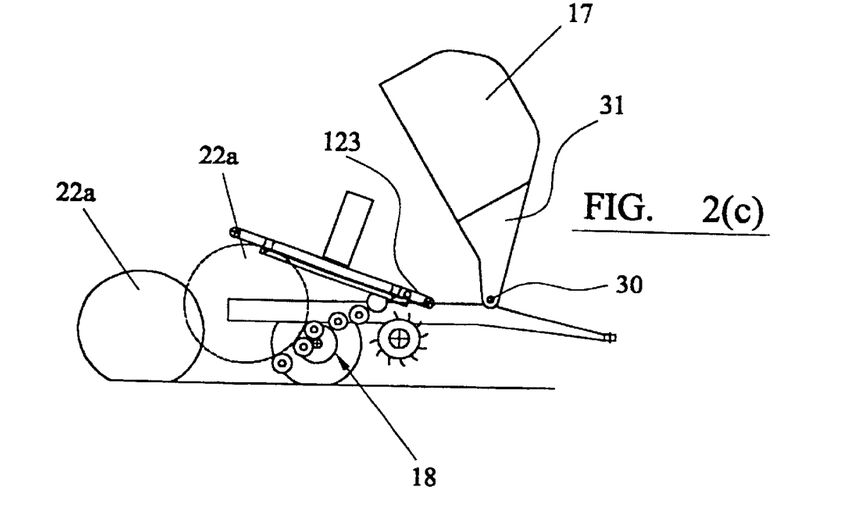
Figure 2D:
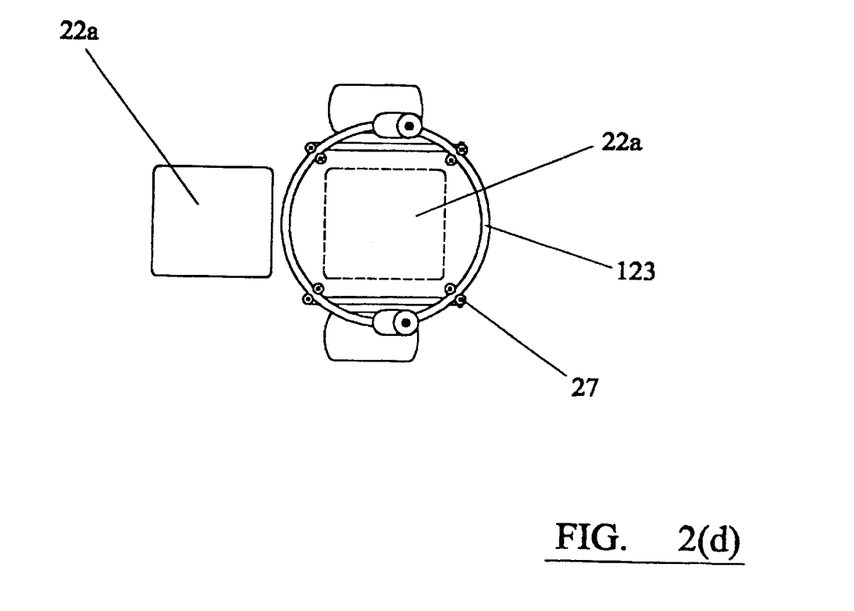
Figure 2E:
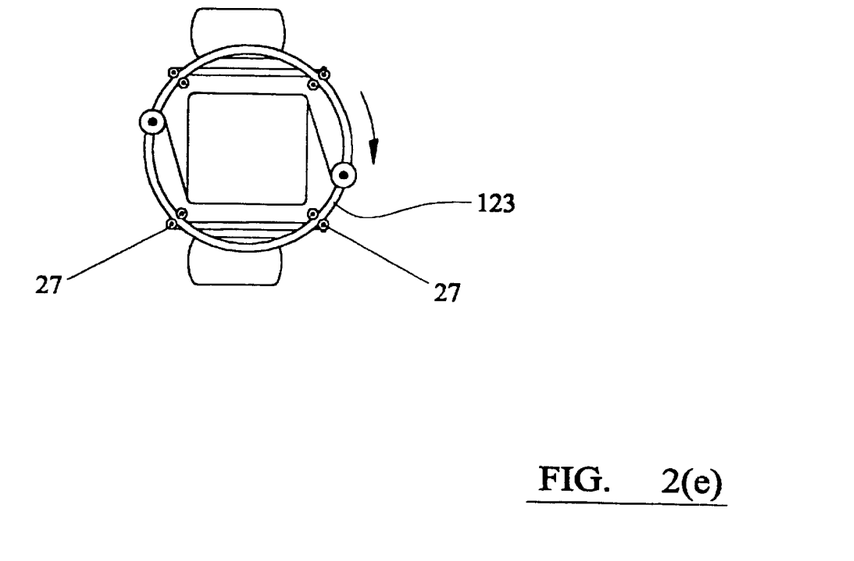

A film reel carrier in the form of a cradle 23 is rotatably mounted on the frame 11 for movement in a plane generally parallel to the ground over which the apparatus 10 moves, and in which the cradle 23 extends at least partly around the bale-forming chamber 20, when seen in plan view (FIG. 1e). At least one holder for a film dispenser reel is carried by the cradle 23, and in the illustrated embodiment a pair of holders are mounted on the cradle 23, at diametrically opposed mounting positions, so that two separate stretched films can be applied simultaneously to the bale 22. The film dispenser reels are shown by reference 24 in FIGS. 1b and 1e. The reels 24 are therefore carried by the cradle 23, and rotate along a circular path during rotation of the cradle 23 so that, when bale 22 has been formed in the chamber 20 and the housing 17 has been moved to the inoperative position, stretch film wrapping is applied to the bale 22 simultaneously with rotation of the bale 22 by the rollers 19 of the lower bale-forming means.

After completion of formation of the wrapped bale, shown by reference 22a in FIGS. 1c and 1d, the apparatus 10 is converted to a discharge mode which, in the case of the apparatus 10, comprises downward adjustment of at least part of the lower bale-forming means 18, as a unit (e.g. the four rollers 19 shown downwardly displaced in FIG. 1c), from an upper bale-forming position (and also bale rotating position) as shown in FIGS. 1a and 1b, and a downwardly pivoted lowered position, shown in FIG. 1c, permitting gravity discharge of the wrapped bale 22a.

It will be noted that the geometry of the components of the apparatus is such that wrapped bale 22a can be downwardly and rearwardly discharged onto the ground, without need to move any of the other components i.e. the cradle 23, apart from rotational adjustment of the cradle 23.

Referring in particular to FIGS. 1d and 1e, it will be noted that the cradle 23 takes the form of a curved frame which is part circular e.g. subtends an angle of between 180° and 270° at its axis of rotation, thereby leaving an exit aperture 25 defined between opposed free ends 26 of the curved frame. To facilitate rearward and downward discharge of the wrapped bale 22a, the curved frame is brought to rest at a position in which the exit aperture 25 lies in the path of discharge of the wrapped bale 22a, so that the curved frame does not obstruct the discharge of the wrapped bale.

Any suitable drive means is provided in order to apply rotation to the cradle 23, and a simple friction drive is preferred e.g. drive rollers 27 arranged in pairs along the circular path of movement of the cradle 23, and which engage the inner and outer faces of the curved frame, and which also define the rotary path of movement of the cradle. Therefore, the rollers 27 also form a guide mounted on the frame 11 and which defines an orbital path of movement for the carrier 23 around the bale.

In the apparatus 10, it will be noted that the cradle 23 is located, in the bale wrapping position, in a horizontal plane which is only slightly above the general level of the frame 11 i.e. it is located below the axis of rotation of bale 22, and therefore the film dispenser reels 24 extend upwardly of the cradle 23 so that the top and bottom edges 28 and 29 (see FIG. 1b) of the film are located substantially equidistantly above and below the axis of rotation of the bale. However, if it is desired to raise the height of the cradle 23 e.g. so that it is located at or above the level of the axis of rotation of the bale 22, then it will be preferable to arrange the film reels to extend above and below the level of the cradle, as shown in FIG. 3.

Also, it is not essential for the cradle 23 to be located parallel to the ground surface, and it may be inclined to the horizontal, provided that the film reel(s) 24 orbit in a plane which passes through, or close to the axis of rotation of the bale.

Referring now to FIG. 2 of the drawings, a second embodiment of the invention will now be described, and which is designated generally by reference 100. This is generally similar to the apparatus 10, and corresponding parts are given the same reference numerals, and will not be described in detail again. However, in the apparatus 100, a different design and arrangement of cradle is provided, which is designated generally by reference 123. The cradle 123 takes the form of a circular frame, extending continuously through 360° about the axis of rotation, as can be seen in FIGS. 2d and 2e. Therefore, since cradle 123 is a continuous circular frame, it does not have the exit aperture 25 of cradle 23, and therefore an alternative construction and arrangement is required, to facilitate discharge of the wrapped bale 22a. Therefore, cradle 123 is pivotally mounted on frame 11, so that it can be pivoted between the horizontal position shown in FIG. 2b, in which bale wrapping takes place, and an upwardly tilted discharge position, shown in FIG. 2c, in which it allows downward and rearward gravity discharge of the wrapped bale 22a. This upward movement of the cradle 123 takes place in conjunction with downward movement of lower bale forming means 18 as a unit, shown in FIG. 2c, and generally similar to the downward adjustment already described with reference to apparatus 10 in FIG. 1.

Finally, referring to FIG. 3, and as mentioned above, there is shown a third embodiment of combined bale forming and bale wrapping apparatus, designated generally by reference 200. Parts corresponding with those already described are given the same reference numerals, and will not be described in detail again.

Figure 3A:
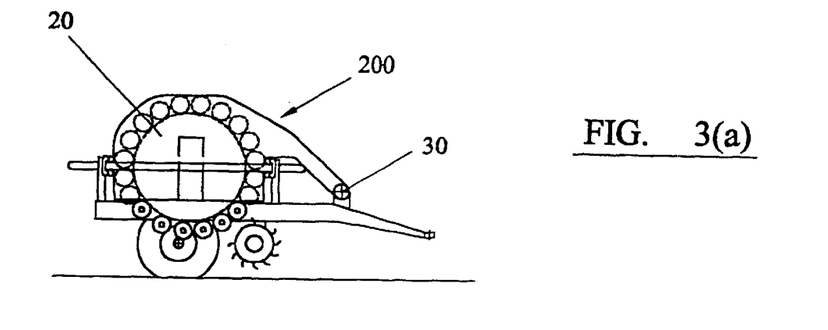
FIGS. 3a to 3e show successive stages of bale forming, bale wrapping and discharge of the wrapped bale; and, FIGS. 4a and 4b show successive stages of operation of a fourth embodiment of the invention.
Figure 3B:
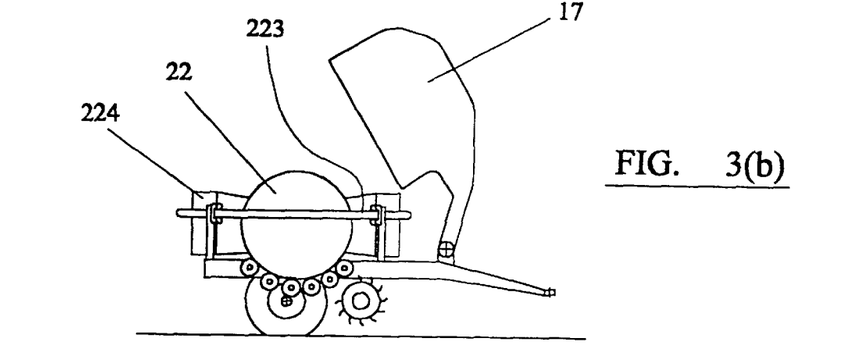
Figure 3C:
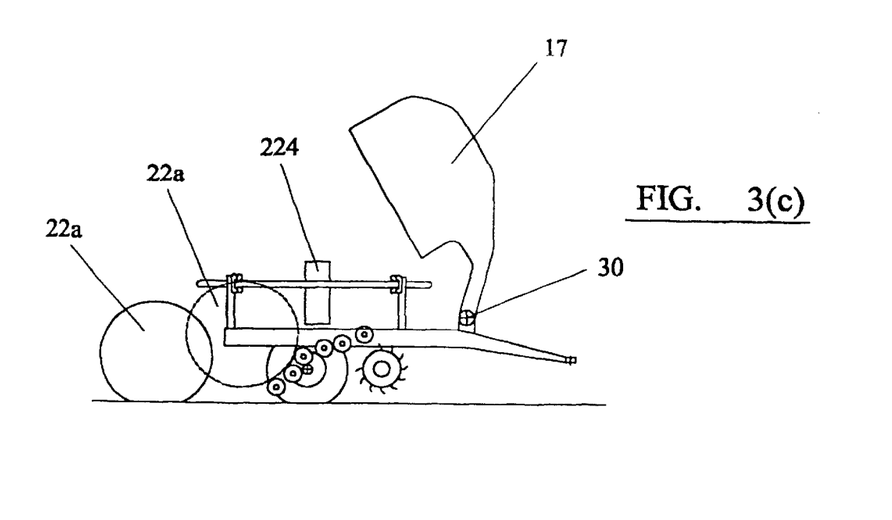
Figure 3D:
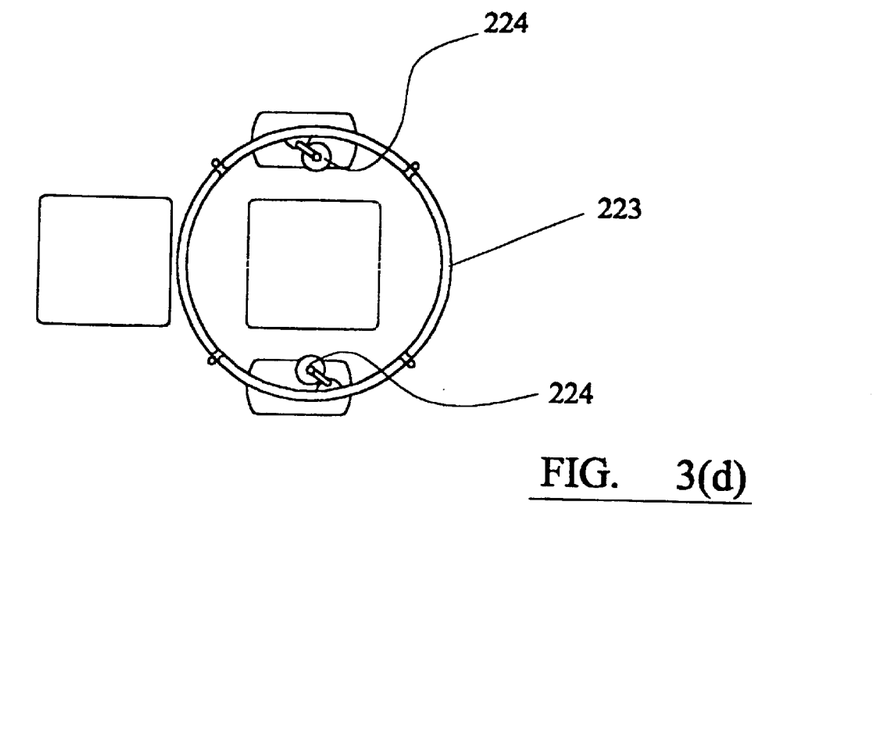
Figure 3E:
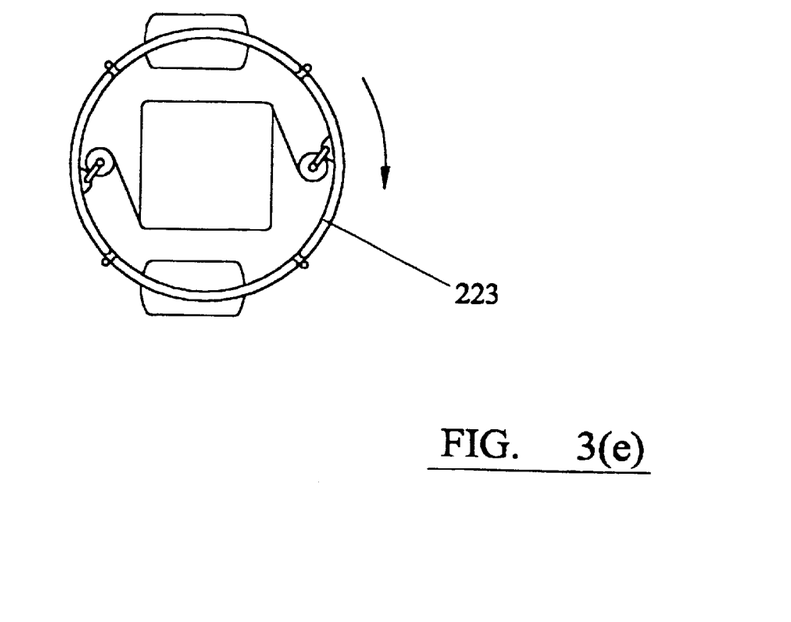

In this embodiment, a circular curved frame is provided for the cradle, as shown by reference 223, but occupying a raised position, in which it is located substantially at the level of the axis of rotation of bale 22, as shown in FIG. 3b. Therefore, in this embodiment, the film dispenser reels 224 are differently arranged, as can be seen in FIGS. 3b and 3c, in which they extend upwardly and downwardly of the general level of the cradle 223, so that the upper and lower edges of the film are located respectively above and below the axis of rotation of bale 22 by substantially equal amounts. Therefore, upon completion of wrapping of bale 22, to form wrapped bale 22a, the wrapped bale can be discharged downwardly and rearwardly under gravity, without need for the cradle 223 to pivot (as per cradle 123 in apparatus 100). Therefore, cradle 223 is located at a level which is high enough to allow free discharge of the wrapped bale 22a.

Also, it will be noted that the film dispenser reels 24 are located inwardly of the cradle 223, which is a safety feature which minimises risk of personal injury to operators and passers-by.

In all of the embodiments of the invention the housing 17 is adjustably mounted on the frame 11 for movement between the bale-forming position and the inoperative position, by being pivotally mounted at its forward end on transversely extending forward pivot mountings 30. The housing 17 comprises a hood which forms an enclosure above frame 11, and in order to define bale-forming chamber 20, and this hood is mounted on the pivot mountings 30 via forwardly projecting mounting arms 31. Conveniently, two separate drive trains are provided, in order to drive the upper and lower rollers 16, 19 of the bale forming means, with the drive train to the upper rollers 16 being routed within or alongside the arms 31, whereas a separate lower drive train is routed to the rollers 19.

A drive train to operate the rollers 16 and 19 can be derived from the power take-off shaft of the propelling vehicle, which is taken to a gearbox generally in line with the pivot mountings 30, and which transmits drive to operate the separate drive trains leading to the upper and lower rollers. Any suitable means may be provided to drive the rollers e.g. chains and sprockets, or belts and pulleys. By routing the drive train to the upper rollers 16 along or alongside the arms 31, by allowing the housing 17 to pivot upwardly about forward pivot mountings 30, this does not require any uncoupling of the drive train, since drive input to the upper drive train can be conveyed along an axis corresponding with the axis of the pivot mountings 30.

Also, with the arrangement of pivot arms 31 connecting the hood to the pivot mountings 30, it is possible to define a field of view (when the hood is in the raised inoperative position) for the driver of the tractor to be able to monitor the progress of the bale wrapping operation.

In the operation of the bale-forming means, it is preferred that the bottom rollers 19 are driven in synchronism e.g. by the same hydraulic circuit, with the rotation of the carrier ring during wrapping. However, during the bale-forming stage, the bottom rollers 19 are driven preferably at the same speed as the top rollers.

Figure 4A:
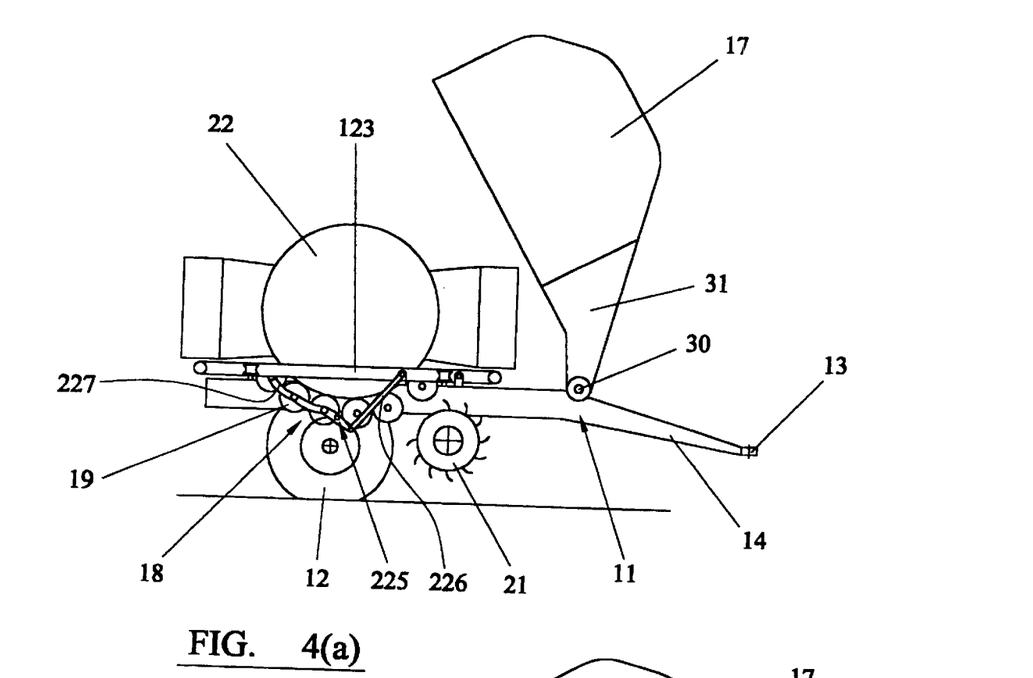
Figure 4B:
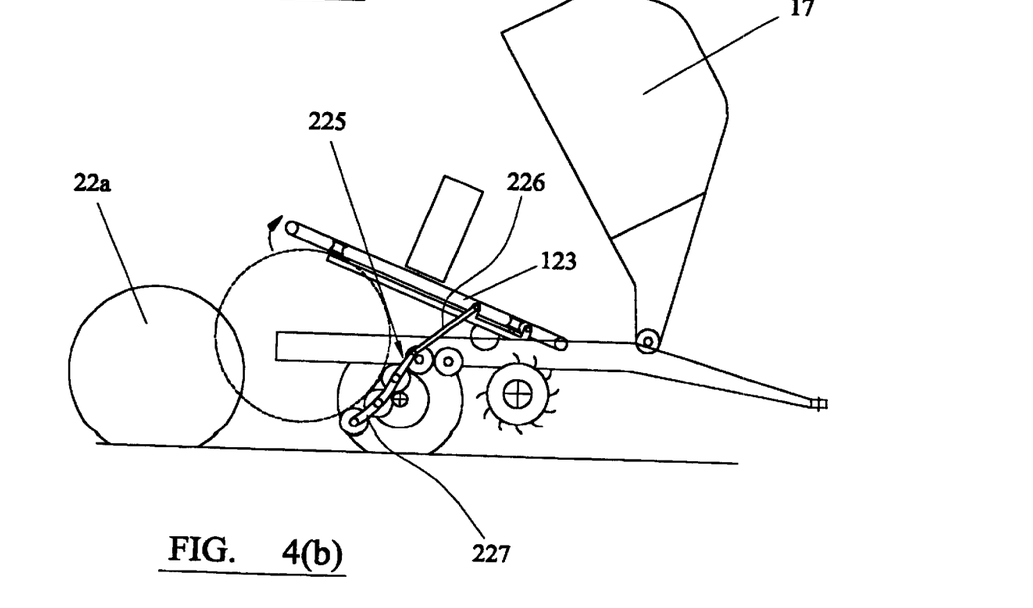

Finally, referring to FIGS. 4a and 4b, this shows a fourth embodiment of the invention, which is generally similar to the arrangement show in FIG. 2, and corresponding parts are therefore given the same reference numerals, and will not be described in detail again.

In the arrangement of FIG. 2, and also in the arrangement of FIGS. 4a and 4b, at the completion of a bale-wrapping operation, the cradle ring 123 pivots upwardly, and at least part of the roller set of the lower bale forming means 18 is moved downwardly, to allow gravity discharge of the wrapped bale 22a onto the ground.

In the arrangement shown in FIGS. 4a and 4b, there is a mechanical linkage, designated generally by reference 225, and which is a two part toggle linkage comprising first link 226 which pivotally connects cradle ring 123 to a second link 227 which carries a rear set of three rollers of the lower bale forming means 18.

Therefore, upon initiation of the final bale-discharging sequence of operation, a suitable power-operated device (not shown in detail) applies upward pivoting movement to the cradle ring 123 and/or downward pivoting movement to the link 227, whereby via the mechanical linkage 225, simultaneous upward movement of the cradle ring 123 is accompanied by downward pivotal movement of the second link 227 and the rear set of rollers carried thereby. This then allows the wrapped bale 22a to be discharged under gravity action so as to fall onto the ground.

The illustrated embodiments are intended to be moved over the ground by a propelling vehicle, which will usually be an agricultural tractor. However, it is within the scope of the claimed invention to provide a self-propelled apparatus.

What is claimed is:

1. A combined baling and wrapping apparatus for use in picking-up crop material lying on the ground, forming the material into a bale, and applying stretched film wrapping to enclose the bale, said apparatus comprising:
   a frame;
   a wheel-set supporting the frame;
   upper and lower bale-forming means defining a bale forming chamber;
   the lower bale-forming means mounted on the frame;
   a pick-up device mounted on the frame and operative to pick-up crop material lying on the ground, and to feed such material to the bale-forming chamber;
   a housing adjustably mounted on said frame for movement between a bale-forming position and an inoperative position, said upper bale-forming means being mounted on said housing for movement therewith;
   a circular arc film reel carrier extending at least partly around the bale forming chamber and forming a plane of rotation, the film reel carrier being separate from the housing and connected to the frame to rotate around the bale forming chamber about an axis of rotation that passes substantially through the center of the film reel carrier substantially perpendicular to the plane of rotation;
   a guide mounted on the frame and defining an orbital path of movement for the carrier around the bale forming chamber; and,
   at least one film reel holder for a film dispenser reel mounted on said carrier and rotatable around the bale forming chamber during rotation of the carrier so that, when a bale has been formed in the chamber and the housing has been moved to the inoperative position, the dispenser reel when mounted on the carrier is configured to apply stretch film wrapping to the bale simultaneously with rotation of the bale by the lower bale-forming means.

2. The apparatus according to claim 1, wherein the lower bale forming means is operative to rotate the bale, after it has been formed, to assist in the wrapping of the bale.

3. The apparatus according to claim 1, wherein the carrier comprises a circular or part circular member provided with at least one mounting point for a film reel holder.

4. The apparatus according to claim 3, wherein two mounting points are provided, which are diametrically opposed to each other with respect to an axis of rotation of the carrier.

5. The apparatus according to claim 3, wherein the carrier comprises completely circular member.

6. The apparatus according to claim 3, wherein the carrier comprises a part circular member, leaving an exit aperture between free ends of the member, the member configured to be brought to rest with the exit aperture lying in a path of discharge of the wrapped bale upon completion of a wrapping cycle, so that the member does not obstruct a discharge of the bale.

7. The apparatus according to claim 3, including drive means to rotate the member.

8. The apparatus according to claim 7, wherein the drive means and the guide comprise drive rollers configured to engage an inner and/or an outer face of the carrier, the drive rollers defining a the orbital path of movement for the carrier.

9. The apparatus according to claim 1, wherein at least part of the lower bale-forming means is adjustably as a unit between an upper bale-forming position and a lowered position permitting gravity discharge of the wrapped bale.

10. The apparatus according to claim 1, wherein the carrier is adjustable mounted for movement between a lowered bale-wrapping position, and a raised position which facilitates discharge of the wrapped bale.

11. The apparatus according to claim 1, wherein the carrier is adapted to carry at least one film dispenser reels, the at least one film dispenser reel configured to extend upwardly of the carrier so that the top and bottom film edges are located substantially equidistantly above and below an axis of rotation of the bale.

12. The apparatus according to claim 1, wherein the carrier is located at a level high enough to give free discharge of the bale, and serves to mount downwardly extending holders for the film reels, or to mount reels configured to extend above and below the level of the carrier.

13. The apparatus according to claim 1, wherein the housing is pivotally mounted on the frame so as to be adjustable between the bale-forming position and the inoperative position.

14. The apparatus according to claim 13, wherein the housing is mounted on the frame via a forward transversely extending pivot mounting.

15. The apparatus according to claim 14, wherein the forward pivot mounting comprises laterally spaced pivot mounting and rearwardly extending arms connecting the housing to the pivot mountings.

16. The apparatus according to claim 15, wherein a drive train to operate the upper bale forming means is routed along the arm, or extends parallel thereto, so as to take-up a drive connection with the upper bale forming means.

17. The apparatus according to claim 15, wherein a separate drive train is routed to the lower bale forming means.

18. The apparatus according to claim 15, wherein the housing, when raised to the inoperative position, defines a clear field of view to a driver of a propelling vehicle, to monitor the progress of the bale wrapping operation.

19. The apparatus according to claim 1, incorporated in a fixed chamber type of baler.

20. The apparatus according to claim 13, wherein a mechanical linkage interconnects the carrier and a part of the lower bale-forming means and which is operative to effect simultaneous upward movement of the carrier and downward movement of said part of the lower bale-forming means, to permit gravity discharge of a wrapped bale.

21. The apparatus according to claim 1, wherein the frame is provided with coupling means to couple the apparatus to a propelling vehicle.

* * * * *

UNITED STATES PATENT AND TRADEMARK OFFICE
CERTIFICATE OF CORRECTION

PATENT NO. : 6,722,110 B1  
DATED : April 20, 2004  
INVENTOR(S) : Erling Royneberg Page 1 of 1

It is certified that error appears in the above-identified patent and that said Letters Patent is hereby corrected as shown below:

Title page,
Item [73], Assignees: "Baat B.V. Engineering, Hengelo (NL); Depuy International Limited, Leeds (GB); Albert Gerrit Veldhuizen, Elde (NL)", should read
-- Kverneland Naerbo AS, Naerbo (NO) --

Column 1,
Line 19, ""big bales")", should read -- "big bales"). --

Column 2,
Line 1, "and-driving", should read -- and driving --

Column 3,
Line 5, "film- dispenser", should read -- film dispenser --

Column 8,
Line 36, "comprises completely", should read -- comprises a completely --
Line 49, "defining a the orbital", should read -- defining the orbital --
Line 60, "dispenser reels,", should read -- dispenser reel, --

Signed and Sealed this

Twenty-ninth Day of June, 2004

JON W. DUDAS
*Acting Director of the United States Patent and Trademark Office*